United States Patent
Sidders

(10) Patent No.: US 12,208,655 B2
(45) Date of Patent: Jan. 28, 2025

(54) METHODS AND SYSTEMS FOR A TRACTOR AND A TRAILER

(71) Applicant: Dana Heavy Vehicle Systems Group, LLC, Maumee, OH (US)

(72) Inventor: Jason M. Sidders, Perrysburg, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 832 days.

(21) Appl. No.: 17/444,639

(22) Filed: Aug. 6, 2021

(65) Prior Publication Data

US 2022/0048346 A1 Feb. 17, 2022

Related U.S. Application Data

(60) Provisional application No. 63/064,230, filed on Aug. 11, 2020.

(51) Int. Cl.
| | |
|---|---|
| *B60D 1/64* | (2006.01) |
| *B60L 50/60* | (2019.01) |
| *B60L 8/00* | (2006.01) |
| *H02J 7/35* | (2006.01) |

(52) U.S. Cl.
CPC ............... *B60D 1/64* (2013.01); *B60L 50/60* (2019.02); *B60L 8/003* (2013.01); *H02J 7/35* (2013.01)

(58) Field of Classification Search
CPC ....................................................... B60D 1/64
See application file for complete search history.

(56) References Cited

U.S. PATENT DOCUMENTS

| | | | |
|---|---|---|---|
| 9,457,666 B2 * | 10/2016 | Caldeira | B60D 1/64 |
| 11,548,572 B2 * | 1/2023 | Köster | B62D 53/0842 |
| 2006/0255559 A1 * | 11/2006 | Abate | B62D 53/125 |
| | | | 280/433 |
| 2011/0114398 A1 | 5/2011 | Bianco | |
| 2019/0111832 A1 * | 4/2019 | Schrag | B60Q 1/247 |
| 2021/0284258 A1 * | 9/2021 | Köster | B62D 53/125 |
| 2021/0300136 A1 * | 9/2021 | Algüera et al. | B60D 1/64 |

FOREIGN PATENT DOCUMENTS

EP 2842814 A1 * 3/2015 ............... B60D 1/64

* cited by examiner

*Primary Examiner* — James A English
*Assistant Examiner* — Hosam Shabara
(74) *Attorney, Agent, or Firm* — McCoy Russell LLP

(57) ABSTRACT

Methods and systems are provided for a coupling device for a tractor and a trailer. In one example, a system, comprising a tractor comprising an engine, a motor, and an electrical energy storage device, a trailer comprising a battery bank and a power distribution unit, and a coupling configured to fixedly couple the trailer to the tractor and to electrically couple the power distribution unit to the electrical energy storage device.

16 Claims, 5 Drawing Sheets

METHODS AND SYSTEMS FOR A TRACTOR AND A TRAILER

CROSS REFERENCE TO RELATED APPLICATION

The present application claims priority to U.S. Provisional Patent Application No. 63/064,230, entitled "METHODS AND SYSTEMS FOR A TRACTOR AND A TRAILER," and filed on Aug. 11, 2020. The entire contents of the above-listed application are hereby incorporated by reference for all purposes.

TECHNICAL FIELD

The present description relates generally to a hybrid tractor with a trailer comprising an electric energy supply.

BACKGROUND AND SUMMARY

Efforts are continually made to reduce automotive impacts on global warming. One example to reduce emissions may include the electrification of vehicles. Passenger vehicles travel in primarily in cities and may recharge electric energy sources frequently via available recharging stations. However, commercial vehicles, such as hybrid electric class 8 tractors, travel long distances between cities and may be unable to frequently recharge due to a lack of recharging stations available outside of cities.

Other examples of addressing power supply to a hybrid electric commercial vehicle include a battery pack on a trailer. One example approach is shown by Bianco in U.S. Application number 2011/0114398. Therein, a trailer battery module is configured to drive an electric motor of the tractor. The trailer is mechanically connected to the tractor via a first connection and the battery is connected to the electric motor via a second connection, separate from the first connection.

However, the inventors have identified some issues with the approach described above. For example, the trailer is connected to the tractor mechanically at a first location and the battery is electrically connected to the electric motor at a second location, wherein linkages between the electric supply and the mechanical connection are separate. This may introduce a variety of issues including adequately coupling the electric supply cable to the battery and additional time for coupling the two connections. Thus, the connection in the example of Bianco may not be robust.

In one example, the issues described above may be addressed by a system, comprising a tractor comprising an engine, a motor, and an electrical energy storage device, a trailer comprising a battery bank and a power distribution unit, and a coupling configured to fixedly couple the trailer to the tractor and to electrically couple the power distribution unit to the electrical energy storage device. In this way, the trailer is quickly coupled to the tractor via a single coupling.

As one example, the coupling comprises a pin shaft configured to couple to a fifth wheel hitch. A clamp of the coupling is configured to hold a connector on a park brake circuit or other circuit. By doing this, the connector is held securely when parked but may pivot/move during a driving mode of the tractor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
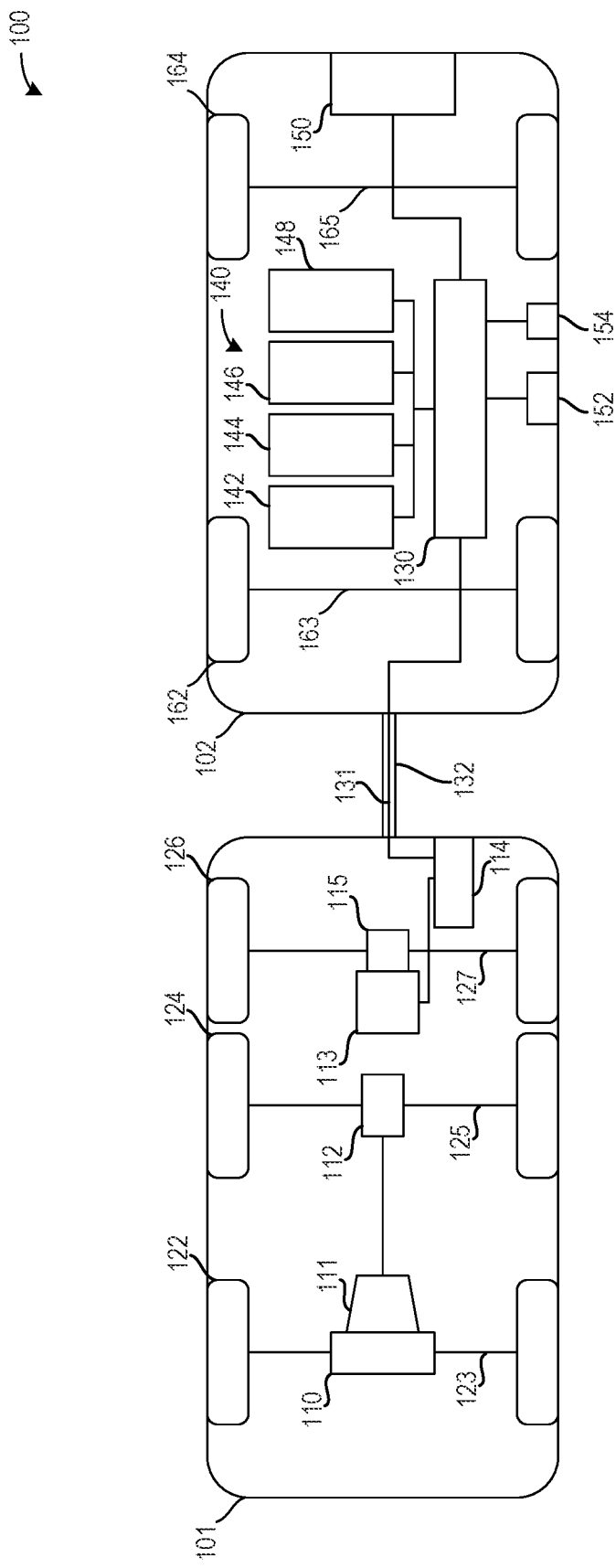
FIG. 1 shows a first embodiment of a tractor and a trailer.
Figure 2:
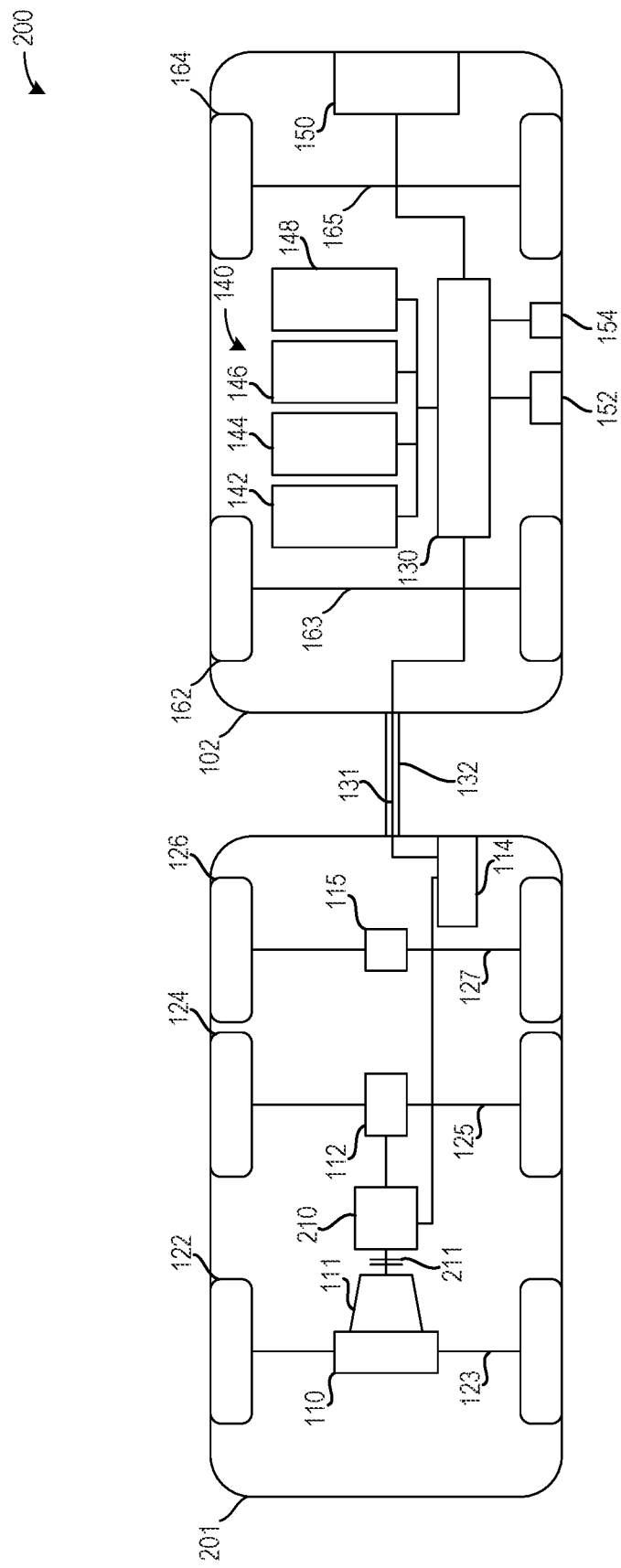
FIG. 2 shows a second embodiment of a tractor and a trailer.
Figure 3:
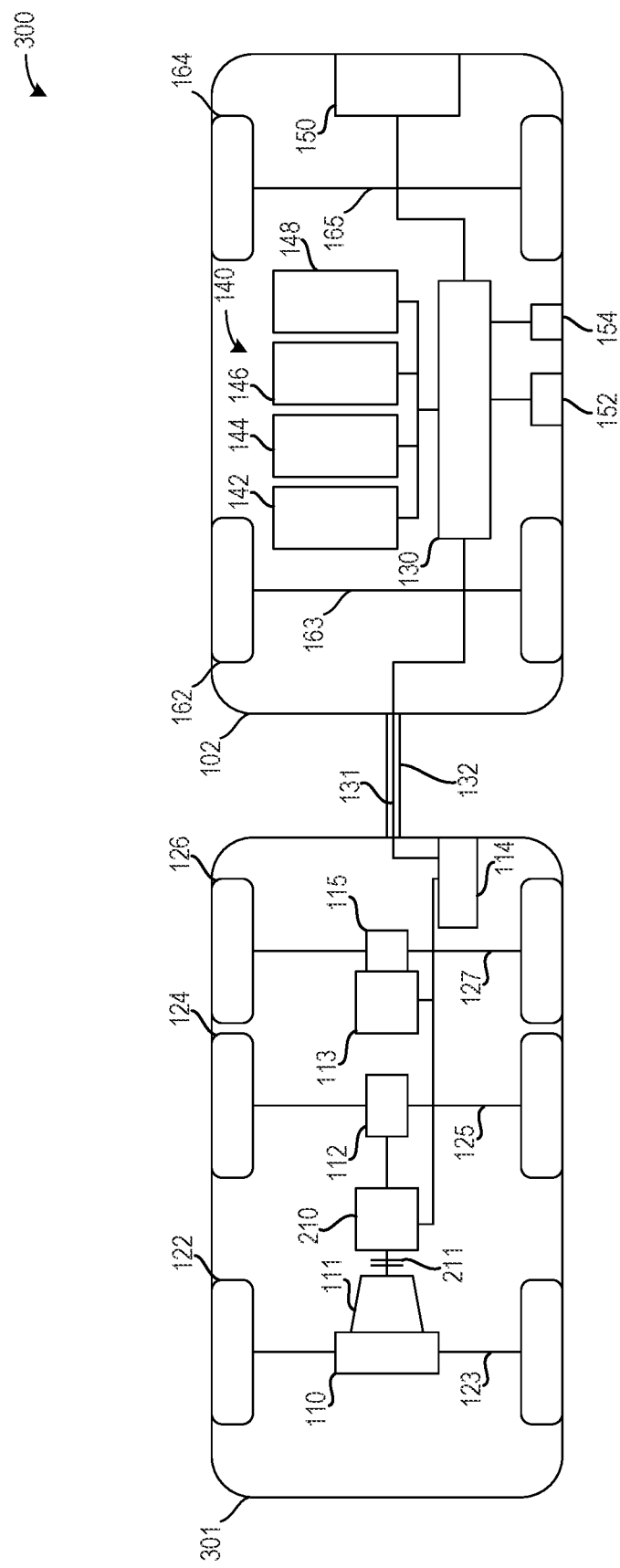
FIG. 3 shows a third embodiment of a tractor and a trailer.

The following description relates to systems and methods for a coupling between a tractor and a trailer. The coupling comprises a mechanical connection and an electrical connection integrally arranged therein. The mechanical connection is configured to physically couple the tractor to the trailer to block separation thereof. The electrical connection is configured to electrically couple one or more electrical energy storage devices of the trailer to an electrical motor of the tractor. By arranging the electrical energy storage device on the trailer, more space is available to increase an electrical energy storage amount, thereby allowing the commercial vehicle to travel longer distances without demanding a recharge. Various arrangements of the tractor and trailer are illustrated in FIGS. 1 to 3. Therein, the tractor in the examples of FIGS. 1, 2, and 3 is a heavy-duty vehicle, such as a semi-truck or the like.

Figure 4:
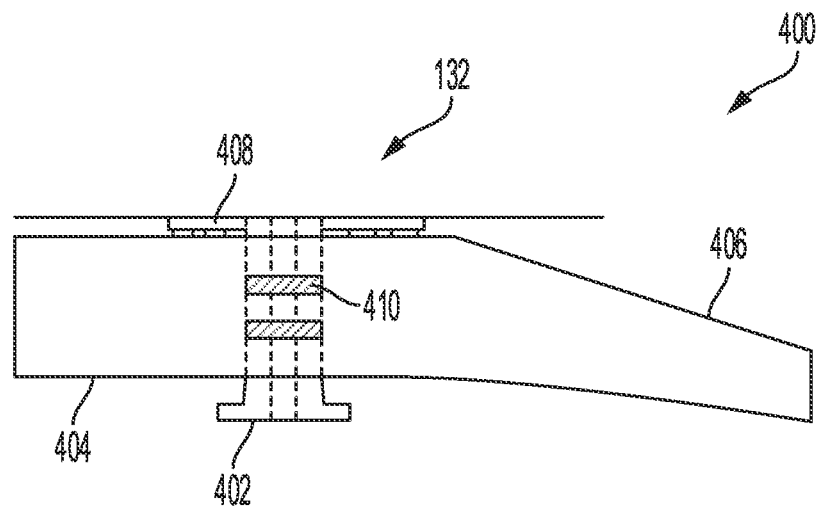
FIG. 4 shows a side-on view of a high voltage slip ring built into a pin and plate.
Figure 5:
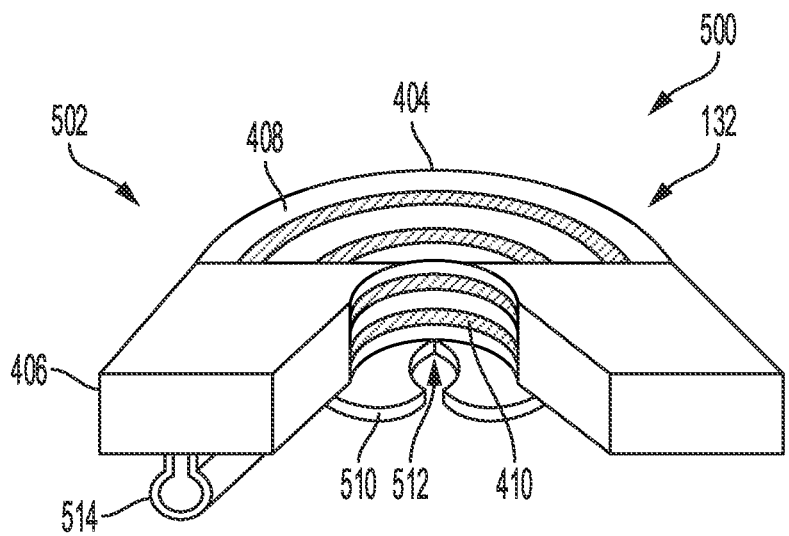
FIG. 5 shows a face-on view of the high voltage slip ring.
Figure 6:
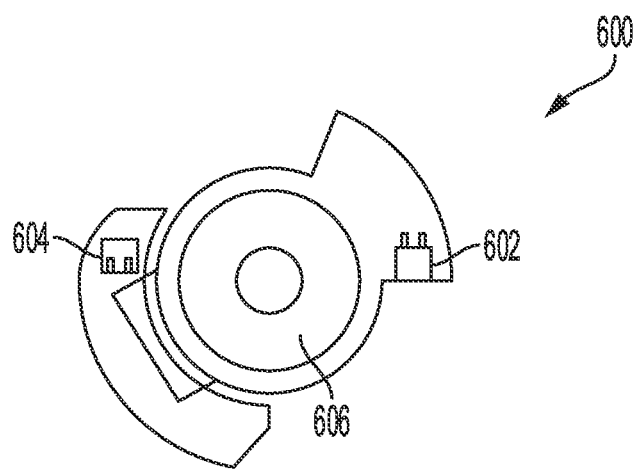
FIG. 6 shows a high voltage interlock loop (HVIL) integrated into a connector.
Figure 7:
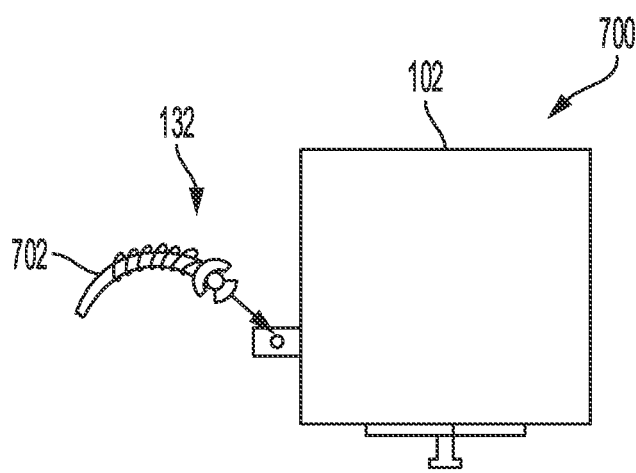
FIG. 7 shows an installation of the connector from the tractor to the pin of the trailer.
Figure 8:
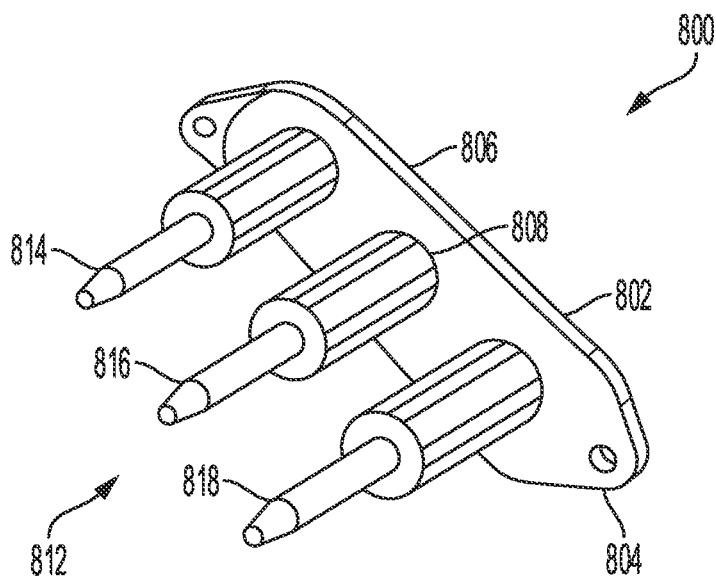
FIG. 8 shows a bridge arranged in the connectors configured to support a weight of cables extending through the connector.
Figure 9:
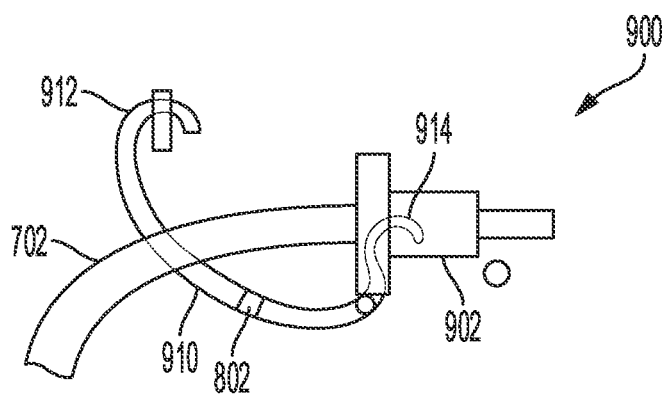
FIG. 9 shows a connector handle configured to support a weight of the cable.

FIGS. 4 and 5 show view of a slip ring assembly of the coupling. The coupling comprises a high-voltage interlock loop (HVIL) integrated therein, as shown in FIG. 6. The coupling extends from the tractor toward an interface of the trailer, as shown in FIG. 7. A cable of the coupling comprises a support, such as a bridge, for supporting a weight of wires extending therethrough, as illustrated in FIG. 8. A second support may be arranged outside of the cable, wherein hooks of the second support couple to openings in the trailer, as shown in FIG. 9.

Turning now to FIG. 1, it shows a first embodiment 100 of a tractor 101 and a trailer 102. The tractor 101 comprises an engine 110, a transmission 111, and a differential 112. The tractor 101 further comprises an electric motor 113, a tractor battery 114, and a drive unit 115. The engine 110, the transmission 111, and the differential 112 are configured to drive a first set of wheels 122 and a second set of wheels 124 via a first drive axle 123 and a second drive axle 125, respectively. The electric motor 113, which receives power from the tractor battery 114, and the drive unit 115 drive a third set of wheels 126 via a third axle 127.

The tractor battery 114 is coupled to a power distribution unit (PDU) 130 of the trailer 102 via a cable 131. As illustrated, the cable 131 extends through a coupling 132. The coupling 132 is configured to mechanically couple the tractor 101 to the trailer 102. That is to say, the engine 110 and the electric motor 113, which drive wheels of the tractor 101, may pull the trailer 102 via the coupling 132. In this way, the coupling 132 may block further separation between the tractor 101 and the trailer 102 relative to a length of the coupling 132.

The cable 131 is configured to supply power from a battery bank 140 of the trailer 102 to the tractor battery 114. In one example, the PDU 130 may comprise a control unit arranged therein or coupled thereto with instructions stored on non-transitory memory thereof that allow the PDU 130 to distribute power from the battery bank 140 to the tractor battery 114 in response to a state of charge (SOC) of the tractor battery 114 being less than a threshold charge (e.g., 20%). The PDU 130 may be further configured to receive and distribute power from a solar panel/inverter 150. In one example, the PDU 130 may use energy from the solar panel/inverter 150 to recharge batteries of the battery bank 140 or the tractor battery 114. Along with charging the battery bank, the PDU can supply supplemental electrical energy from the solar cells to extend the range of the tractor. Once the battery energy reserve falls below a threshold value e.g. 20%, the gasoline or diesel engine may become the primary vehicle power source.

In one example, the tractor battery 114 is a 300 kW battery and the batteries of the battery bank 140 are 200 to 250 kW batteries. The battery bank 140 comprises a first battery 142, a second battery 144, a third battery 146, and a fourth battery 148. The first battery 142, the second battery 144, the third battery 146, and the fourth battery 148 may be substantially identical to one another. The PDU 130 may be further configured to recharge the battery bank 140 via a direct current fast charger (DCFC) 152 and an onboard charger 154. The onboard charger 154 may be configured to convert AC input from a grid (e.g. charging station) to DC input, which charges the batteries. The onboard charger 154 may be further configured to modify a voltage receive from the grid to match a voltage of the batteries.

The trailer 102 comprises a fourth set of wheels 162 arranged along a fourth axle 163 and a fifth set of wheels 164 arranged along a fifth axle 165. The fourth set of wheels 162 and the fifth set of wheels 164 are not directly driven by a power source. However, the engine 110 and the electric motor 113, in combination with the coupling 132 may cause the fourth and fifth sets of wheels to rotate.

Turning now to FIG. 2, it shows an embodiment 200 of a tractor 201 and the trailer 102. Components previously introduced are similarly numbered in this figure and subsequent figures. The tractor 201 is similar to the tractor 101 of FIG. 1 except that an electric motor 210 is arranged between the transmission 111 and the differential 112. The tractor 201 is further differentiated from the tractor 101 of FIG. 1 in that a clutch 211 is arranged between the transmission 111 and the electric motor 210. In one example, the hybrid arrangement of the tractor 201 in FIG. 2 illustrates a parallel hybrid arrangement wherein the engine may be driven to drive the wheels and recharge the tractor battery 114 by driving the electric motor 210 as a generator.

Turning now to FIG. 3, it shows an embodiment 300 of a tractor 301 and the trailer 102. The tractor 301 is similar to combination of the hybrid arrangements of the tractor 201 of FIG. 2 and the tractor 101 of FIG. 1. More specifically, the tractor 301 comprises two electric motors, including the first electric motor 113 and the second electric motor 210.

Turning now to FIG. 4, it shows an embodiment 400 of the coupling 132 coupling to a fifth wheel pin 402 of a tractor (e.g., tractor 101 or tractor 201 or tractor 301 of FIGS. 1, 2, and 3, respectively). As known to those of ordinary skill in the art, a fifth-wheel coupling may provide an interface between the tractor and the trailer. The coupling comprises the fifth wheel pin 402 protruding from the trailer and a horseshoe shaped or a U-shaped coupling, illustrated in FIG. 5, on the tractor.

A pivot plate 404 may rotate relative to the fifth wheel pin 402 in conjunction with a steering wheel of the tractor. A ramp 406 may be fixed and allow the trailer to move in conjunction with the tractor via the pivot plate 404 and the coupling 132.

A first set of high voltage slip rings 408 may be integrally arranged in the fifth wheel pin 402 and the pivot plate 404. The first set of high voltage slip rings 408 may be pressed against an upper surface of the pivot plate 404. A second set of high voltage slip rings 410 may be arranged on a shaft of the fifth wheel pin 402 and an inner diameter of the pivot plate 404. The first and second sets of slip rings 408 and 410 may be configured to transmit signals and power from the trailer and the tractor. As such, the first and second sets of slip rings may be conductive. In one example, the first and second sets of slip rings 408 and 410 comprise graphite or a similar material with a low coefficient of friction to decrease a corona discharge potential along with having self-lubrication properties.

In the example of FIG. 4, the fifth wheel pin 402 is illustrated adjacent to the ramp 406. However, additionally or alternatively, the fifth wheel pin 402 may be arranged further from to the ramp 406, which may enhance a centering function of the pivot plate 404 in some arrangements.

Turning now to FIG. 5, it shows an embodiment 500 of a horseshoe portion 502 of the coupling 132. The fifth wheel pin 402 is omitted in the embodiment 500 to further illustrate the horseshoe portion 502 of the pivot plate 404 along with the first and second sets of slip rings 408 and 410. The coupling 132 comprises a jaw coupling 510 with a pin slot 512 through which the fifth wheel pin 402 extends. The jaw coupling 510 may be arranged along a central portion of the horseshoe portion 502 (e.g., a bend of the horseshoe portion 502). The pivot plate 404, along with the slip rings, comprise a U-shape and extend from a first end of the ramp 406 to a second end of the ramp 406, wherein the first end is opposite of the second end. The first end and the second end of the ramp 406 are separated from one another via the pivot plate 404. The jaw coupling 510 is arranged on a first side of the pivot plate 404 and the first set of slip rings 408 are arranged on a second side of the pivot plate 404, opposite the first side. In one example, the first side is an upper side and the second side is a bottom side.

The coupling 132 may integrate an electrical connection 514 into the bottom side of the ramp 406. As illustrated in FIG. 5, the electrical connection 514 extends from the bottom side of the first end of the ramp 406. In one example, the electrical connection 514 is a high-voltage socket.

A mating connector, such as the jaw coupling 510, may be fixedly held in place via a pneumatic clamp on a circuit of the park brake. By doing this, the mating connector may be securely held when parked but allowed to pivot during driving conditions. Thus, the jaw coupling portion is fixed when the park break circuit is active and pivotable when the park break circuit is inactive. In one example, the mating connector comprises a curly hose style (e.g., a spring coil wrap) for allowing the coupling 132 and/or portions thereof to bounce and/or rebound. While the electrical connection 514 is illustrated on the bottom side of the ramp 406, it will be appreciated that it can be arranged on the sides or back of the ramp 406 and/or the pivot plate 404 without departing from the scope of the present disclosure.

The pneumatic clamp may be actuated to vertically raise and lower to engage and disengage the coupling 132 from the tractor 101. The electrical connection 514 may be automatically connected once the pneumatic clamp is fully actuated in a first direction and automatically disconnected once the pneumatic clamp is fully actuated in a second direction. The cable, which passes through the electrical connection 514, is configured to twist and/or flex from side to side by at least 120 degrees to accommodate vehicle movements, coupling elements movements, and the like.

Turning now to FIG. 6, it shows an embodiment 600 of a high-voltage interlock loop (HVIL) circuit comprising HVIL pins 602 and an HVIL socket 604. In one example, the HVIL pins 602 are male pins and the HVIL socket 604 is female pins. In one example, a HV contact ring 606, which may be a slip ring in one example, electrically completes the HVIL pins 602 to the HVIL socket 604. In one example, the cable of the trailer, which extends from the PDU, may electrically couple to the HVIL socket 604 and a cable from the tractor battery may electrically couple to the HVIL pins 602. By utilizing the HVIL circuit, the electrical connection between the trailer and the tractor may be more secure, which may mitigate arcing and other issues associated with high-voltage connections partially separating. To enhance the connection between the HVIL pins 602 and HVIL socket 604, a center tolerance of +/−2 mm in pin position may be desired. In one example, the contact ring 606 is one of a plurality of rings, wherein the plurality of rings is not electrified until HVIL pins 602 and the HVIL socket 604 are fully coupled to respective cables of the tractor and trailer. In one example, two or more of the wires and cables leading to the HVIL circuit may be twisted and/or locked together with the HVIL pins 602 and the HVIL socket 604.

In one example, the HVIL pins 602 are arranged on a first half of the connection and the HVIL socket 604 is arranged on a second half of the connection. The first half and the second half are substantially identical in shape and size apart from the first half comprising the HVIL pins 602 and the second half comprising the HVIL socket 604. In one example, the slip ring is arranged in a central opening of each of the first half and the second half of the connection. The slip ring may be a flexible elastomeric material configured to allow a high-voltage electrical connection to pass therethrough. Each half of the connection may comprise the slip ring, wherein the slip rings may be pressed against one another and form a sealed engagement with one another when the connection is fully engaged.

Turning now to FIG. 7, it shows an embodiment 700 of the trailer 102 physically and electrically coupling to the tractor via the coupling 132. In one example, the coupling 132 is pressed against a portion of the HVIL circuit corresponding to the trailer by extending a cable 702 from the tractor to the trailer 102. Once contact is made, the coupling 132 is rotated and pressed down into a locked position, thereby fixedly and electrically coupling the trailer 102 and the tractor.

Turning now to FIG. 8, it shows an embodiment 800 of a support 802 through which a plurality of wires 812 of the cable 702 extend. In one example, the support 802 is a bridge. The support 802 comprises curved ends 804 separated by long sides 806. In one example, the support 802 comprises a rectangular shape with curved edges. The support 802 may support a weight of the plurality of wires 812 of the cable 702, which may limit inadvertent electrical disconnection of the trailer from the tractor. The support 802 comprises a plurality of openings 808, wherein each opening is configured to allow a wire of the plurality of wires 812 to pass therethrough. The plurality of wires 812 comprises a first wire 814, a second wire 816, and a third wire 818, each passing through corresponding openings of the plurality of openings 808. In one example, the first wire is a hot wire, the second wire 816 is a carrier wire, and the third wire 818 is a ground wire.

Turning now to FIG. 9, it shows an embodiment 900 of the coupling 132. As illustrated, a connector latch 902 of the coupling 132 secures onto the trailer. In one example, the connector latch 902 may bear a majority of a weight of the cable 702. A handle 910 is physically coupled to the cable 702, wherein the handle 910 comprises a first hook 912 and a second hook 914 arranged at opposite ends of the handle 910. The first hook 912 and the second hook 914 couple to a corresponding latch pin of the trailer.

The support 802 is arranged in the handle 910 and assists the connector latch 902 in bearing the weight of the cable 702. The support 802 spans the width of the handle 910 and is positioned distally to the hooks to form a triangular shape.

In one example, the support 802 is configured to support the electrical wires while being positioned in the handle 910. The handle 910 may comprise a width equal to a width of the connector latch 902. Additionally, the support 802 may span an entire length of the handle 910 form the first 912 to the second hook 914. When the first and second hooks engage with latch pins of the trailer and the handle is fully seated and locked in position via the hooks. The support 802 may be positioned in a same plane as the wires exiting the cable 702 and thereby able to provide support (e.g., strain relief) to the cable 702 and/or connector latch 902. As illustrated in FIG. 8, the wires exiting the cable 702 may pass through openings of the support 802 between the connector and the connector latch 902.

In this way, a coupling between a tractor and a trailer may be simplified such that a physically coupling and an electrical coupling may be completed via a single coupling. The technical effect of integrating the electrical coupling with the mechanical coupling is to simplify a connection between the tractor and the trailer. By doing this, a user may more quickly and accurately couple the tractor and the trailer.

An embodiment of a system comprises a vehicle comprising an engine, a motor, and an electrical energy storage device, a trailer comprising a battery bank and a power distribution unit, and a coupling configured to fixedly couple the trailer to the vehicle and to electrically couple the power distribution unit to the electrical energy storage device. A first example of the system further includes where the coupling comprises a high-voltage interlock loop feature. A second example of the system, optionally including the first example, further includes where the coupling comprises a jaw coupling feature fixedly coupling a pivot plate and a fifth wheel pin of the coupling. A third example of the system, optionally including one or more of the previous examples, further includes where the pivot plate and the fifth wheel pin comprise slip rings. A fourth example of the system, optionally including one or more of the previous examples, further includes where opposite ends of a ramp extend from ends of the pivot plate, and wherein an electrical connection extends along a bottom side of the ramp. A fifth example of the system, optionally including one or more of the previous examples, further includes where a cable comprises one or more electrical wires of an electrical coupling portion of the coupling, wherein a handle extends below the cable and supports a weight of the cable. A sixth example of the system, optionally including one or more of the previous examples, further includes where the trailer comprises a solar panel configured to supply energy to the battery bank. A seventh example of the system, optionally including one or more of the previous examples, further includes where the power distribution unit is configured to supply electrical energy to the electrical energy storage device via the coupling. An eighth example of the system, optionally including one or more of the previous examples, further includes where the coupling is the only coupling between the vehicle and the trailer.

An embodiment of a system, comprises a heavy-duty vehicle comprising an engine and an electric motor, wherein the electric motor is configured to receive power from a battery, a trailer comprising a battery bank, a power distribution unit, and a solar panel, wherein the power distribution unit is configured to supply energy from the battery bank to the battery via an electrical connection, and a coupling device coupling the heavy-duty vehicle to the trailer, wherein the coupling device blocks separation of the heavy-duty vehicle and the trailer, wherein the electrical connection is integrally arranged in the coupling device. A first example of the system further includes where a handle comprising hooks is configured to support a cable of the coupling device. A second example of the system, optionally including the first example, further includes where a support extends along an entire length of the handle between the hooks. A third example of the system, optionally including one or more of the previous examples, further includes where electrical wires pass through openings of the support. A fourth example of the system, optionally including one or more of the previous examples, further includes where the coupling device comprises a clamp configured to couple a jaw coupling portion to a park break circuit. A fifth example of the system, optionally including one or more of the previous examples, further includes where the jaw coupling portion is fixed when the park break circuit is active and pivotable when the park break circuit is inactive.

An embodiment of a hybrid or electric tractor trailer, comprises a tractor comprising an electric motor and a tractor battery, a trailer comprising a plurality of batteries, and a coupling configured to couple the trailer to the tractor at a hitch, the coupling further comprising an electrical connection extending through the hitch and configured to couple the plurality of batteries to the tractor battery. A first example of the tractor trailer further includes where the coupling comprises a pin shaft configured to couple to the hitch, wherein the hitch is a fifth wheel hitch. A second example of the tractor trailer, optionally including the first example, further includes where the coupling comprises a jaw coupling feature fixedly coupling a pivot plate and a fifth wheel pin of the coupling, and wherein the pivot plate and the fifth wheel pin comprise slip rings. A third example of the tractor trailer, optionally including one or more of the previous examples, further includes where the pivot plate is configured to rotate about the fifth wheel pin. A fourth example of the tractor trailer, optionally including one or more of the previous examples, further includes where the coupling comprises a high-voltage interlock loop (HVIL) circuit comprising HVIL pins and an HVIL socket, wherein a cable from a power distribution unit of the tractor trailer couples to the HVIL socket.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a vehicle comprising an engine, a motor, and an electrical energy storage device;
   a trailer comprising a battery bank and a power distribution unit; and
   a coupling configured to fixedly couple the trailer to the vehicle and to electrically couple the power distribution unit to the electrical energy storage device, wherein the coupling comprises a high-voltage interlock loop feature.

2. The system of claim 1, wherein the coupling comprises a jaw coupling feature fixedly coupling a pivot plate and a fifth wheel pin of the coupling.

3. The system of claim 2, wherein the pivot plate and the fifth wheel pin comprise slip rings.

4. The system of claim 3, wherein opposite ends of a ramp extend from ends of the pivot plate, and wherein an electrical connection extends along a bottom side of the ramp.

5. The system of claim 1, wherein a cable comprises one or more electrical wires of an electrical coupling portion of the coupling, and wherein a handle extends below the cable and supports a weight of the cable.

6. The system of claim 1, wherein the trailer comprises a solar panel configured to supply energy to the battery bank.

7. The system of claim 1, wherein the power distribution unit is configured to supply electrical energy to the electrical energy storage device via the coupling.

8. The system of claim 1, wherein the coupling is the only coupling between the vehicle and the trailer.

9. A system, comprising:
a heavy-duty vehicle comprising an engine and an electric motor, wherein the electric motor is configured to receive power from a battery;
a trailer comprising a battery bank, a power distribution unit, and a solar panel, wherein the power distribution unit is configured to supply energy from the battery bank to the battery via an electrical connection; and
a coupling device coupling the heavy-duty vehicle to the trailer, wherein the coupling device blocks separation of the heavy-duty vehicle and the trailer, wherein the electrical connection is integrally arranged in the coupling device, and wherein the coupling device comprises a clamp configured to couple a jaw coupling portion to a park break circuit.

10. A system, comprising:
a heavy-duty vehicle comprising an engine and an electric motor, wherein the electric motor is configured to receive power from a battery;
a trailer comprising a battery bank, a power distribution unit, and a solar panel, wherein the power distribution unit is configured to supply energy from the battery bank to the battery via an electrical connection; and
a coupling device coupling the heavy-duty vehicle to the trailer, wherein the coupling device blocks separation of the heavy-duty vehicle and the trailer, wherein the electrical connection is integrally arranged in the coupling device, and wherein a handle comprising hooks is configured to support a cable of the coupling device.

11. The system of claim 10, wherein a support extends along an entire length of the handle between the hooks.

12. The system of claim 11, wherein electrical wires pass through openings of the support.

13. The system of claim 9, wherein the jaw coupling portion is fixed when the park break circuit is active and pivotable when the park break circuit is inactive.

14. A hybrid or electric tractor trailer, comprising:
a tractor comprising an electric motor and a tractor battery;
a trailer comprising a plurality of batteries; and
a coupling configured to couple the trailer to the tractor at a hitch, the coupling further comprising an electrical connection extending through the hitch and configured to couple the plurality of batteries to the tractor battery, wherein the coupling comprises a jaw coupling feature fixedly coupling a pivot plate and a fifth wheel pin of the coupling, and wherein the pivot plate and the fifth wheel pin comprise slip rings.

15. The tractor trailer of claim 14, wherein the pivot plate is configured to rotate about the fifth wheel pin.

16. A hybrid or electric tractor trailer, comprising:
a tractor comprising an electric motor and a tractor battery;
a trailer comprising a plurality of batteries; and
a coupling configured to couple the trailer to the tractor at a hitch, the coupling further comprising an electrical connection extending through the hitch and configured to couple the plurality of batteries to the tractor battery, wherein the coupling comprises a high-voltage interlock loop (HVIL) circuit comprising HVIL pins and an HVIL socket, and wherein a cable from a power distribution unit of the tractor trailer couples to the HVIL socket.

* * * * *